United States Patent [19]

Gobron et al.

[11] 3,878,249

[45] Apr. 15, 1975

[54] PROCESS FOR PRODUCING METHACROLEIN

[75] Inventors: Georges Gobron; Claude Falize; Henri Dufour, all of Melle (Deux-Sevres), France

[73] Assignee: Rhone-Progil, Courbevoie, France; by said Dufour

[22] Filed: Aug. 13, 1969

[21] Appl. No.: 849,886

[30] Foreign Application Priority Data
Sept. 23, 1968 France .................................. 68.493

[52] U.S. Cl. .............................. 260/601 R; 252/476
[51] Int. Cl. ............................................ C07c 47/20
[58] Field of Search ...... 260/601 R, 680 E; 252/476

[56] References Cited
UNITED STATES PATENTS

| | | | |
|---|---|---|---|
| 1,868,704 | 7/1932 | Hale et al. ........................ | 260/601 R |
| 2,055,269 | 9/1936 | VanPeski et al. ................. | 260/601 R |
| 2,101,820 | 12/1937 | Woodhouse ...................... | 260/601 R |
| 3,271,459 | 9/1966 | Brill et al. ........................ | 252/437 |
| 3,399,246 | 8/1968 | Traynor ........................... | 260/680 E |
| 3,468,969 | 9/1969 | Waerner .......................... | 260/680 E |

FOREIGN PATENTS OR APPLICATIONS

| | | | |
|---|---|---|---|
| 1,340,385 | 9/1963 | France ............................. | 260/601 R |
| 1,124,797 | 8/1968 | United Kingdom ............. | 260/601 R |

*Primary Examiner*—Donald G. Daus
*Assistant Examiner*—D. B. Springer

[57] ABSTRACT

A catalytic process for producing methacrolein comprising reacting isobutyraldehyde in admixture with an oxygen-containing gas in the presence of a silver catalyst deposited on a silica carrier.

16 Claims, No Drawings

PROCESS FOR PRODUCING METHACROLEIN

The present invention relates to a process for producing methacrolein by oxidative dehydrogenation of isobutyraldehyde in vapor phase in the presence of a catalyst.

The concept of the present invention resides in contacting a mixture of isobutyraldehyde vapors in admixture with an oxygen-containing gas with a silver catalyst deposited on a silica base carrier at a temperature within the range of 150°–300°C.

The reaction may be carried out in a continuous manner by passing the mixture of the isobutyraldehyde vapors and oxygen-containing gas in contact with the catalyst maintained at 150°–300°C., and preferably in the range of 170°–250°C. As used herein, the term "oxygen-containing gas" is meant to refer to and include air, air which has been diluted with an inert gas such as nitrogen or carbon dioxide or a gas which is capable of evolving oxygen at the reaction temperatures. The proportion of the oxygen in the oxygen-containing gas is preferably within the range of 5–20% by volume, and the molar ratio of the oxygen to isobutyraldehyde generally falls within the range of 0.1:1 to 1:1. The contact time of the reaction mixture in contact with the catalyst generally is within the range of 2–5 seconds. It will be understood that the operation may be carried out at atmospheric pressure or at superatmospheric pressures within the range of 1–5 kgs. per square centimeter gage.

The catalyst may be prepared by depositing silver on a silica base carrier by any of a wide variety of conventional techniques. For example, it is possible to impregnate pure or substantially pure silica grains with a silver salt, or pelletize a powder obtained from a silver salt and a silica gel, or convert a cake of silica impregnated with a silver salt to catalyst grains.

The nature of the anion of the silver salt used in the foregoing methods is not critical, and any silver salt may be used. Illustrative are the nitrate, sulfate, sulfite, carbonate, phosphate, halides such as the bromide, chloride, etc., cyanate, thiocyanate, iodate, chlorate, chromate and permanganate salts, as well as the salts or organic acids such as the acetate, oxalate and the like.

The silica carrier is generally one of the silicas generally available, and it is preferred that the carrier, prior to impregnation, have a specific surface less than 1,000 square meters per gram. The amount of the silver salt combined with the carrier is not critical, and it is generally present in an amount up to about 40% by weight calculated by free silver.

In accordance with the practice of the present invention, the conversion rate of isobutyraldehyde per passage is 10–50% and usually is about 30%, while the conversion of isobutyraldehyde to methacrolein is generally within the range of 5–20%. The practical yield of conversion to methacrolein is variable but can be as high as 55%.

In the operation of the process according to the present invention, there are a variety of secondary reactions which may occur. For example, the isobutyraldehyde may be completely oxidized to carbon monoxide and carbon dioxide if the reaction temperature is too high, if an insufficient amount of heat of reaction is removed from the catalyst bed, or if the specific area of the catalyst carrier is too large.

Another side reaction stemming from the oxidation of isobutryaldehyde is the formation of various acids, most notably isobutyric acid, which are similarly formed at high temperatures. The amoount of the acid products calculated on the basis of isobutyric acid can be as high as 50% of the methacrolein formed but is generally about 25%. In addition to the oxidation reaction, if the reaction temperature is too low, the formation of isopropanol in an amount corresponding to 2–10% of the isobutyraldehyde converted is experienced. Also, the formation of diacetyl in an amount corresponding to 2–10% of the isobutyraldehyde converted and acetone in an amount between 5 and 15% are also experienced. However, the operation of the process in accordance with the present invention minimizes the formation of the foregoing undesirable side products. The reactor effluent, containing small amounts of these by-products, can be treated in accordance with conventional procedures such as condensation and distillation in order to separate the methacrolein product.

The following examples, which are provided by way of illustration and not by way of limitation, illustrate the process according to the present invention.

EXAMPLE I

A catalyst is prepared by impregnating a pure silica having the following characteristics:

| | |
|---|---|
| Specific area | 14 $m^2$ per gram |
| Specific volume | 0.6 $cm^3$ per gram |
| Average diameter of the pores | 1400 A |

A solution is prepared by dissolving 42 grams of silver nitrate in 15 mm. of water, and 14.1 grams of ammonium carbonate monohydrate are added to form a yellow precipitate of silver carbonate. The silver carbonate precipitate is then dissolved in aqueous ammonium and the resulting solution is used to impregnate 240 grams (400 ml.) of the silica. The catalyst is dried at a temperature within the range of 100°–110°C. for 24 hours and then calcined at 500°C. for 1 hour.

The reaction furnace comprises a quartz tube having an internal diameter of 25 mm. The tube is vertically disposed, and is provided at its base with a stainless steel wire gauze which serves to support the contents of the tube. The tube is supplied with pure, untreated silica such that the untreated silica forms a layer 10 centimeters in height above the wire gauze. Approximately 200 mls. of the catalyst is added, and form a second layer of impregnated silica of a height of approximately 40 centimeters above the untreated silica layer.

An electrical resistance-type heater is provided at a level in the tube approximately 15 centimeters above the catalytic bed and a temperature sensing device is inserted into the lower portion of the catalytic bed so that the heater can be controlled according to the temperature prevailing in the lower portion of the catalyst zone. The heater is used to vaporize a liquid isobutyraldehyde feed, and also to preheat air fed to the reactor.

The furnace containing the catalyst is continuously fed with 160 grams per hour of isobutyraldehyde, 80 liters per hour of air and 70 liters per hour of nitrogen, while the reaction zone is maintained at a temperature of 190°–200°C. The vaporous effluent issuing from the base of the furnace is passed through a condenser cooled by tap water and then through a condenser maintained at −70°C. to recover condensable products of the mixture.

Analysis of the reactor effluent by gas phase chromatography revealed the following composition:

| | | |
|---|---|---|
| Isobutyraldehyde | 120.5 | g/hr. |
| Methacrolein | 19.6 | g/hr. |
| Diacetyl | 0.38 | g/hr. |
| Isopropanol | 0.16 | g/hr. |
| Acetone | 1.2 | g/hr. |
| Acids (calculated as isobutyric acid) | 4.6 | g/hr. |

The remainder of the isobutyraldehyde conversion products is a mixture of carbon monoxide and carbon dioxide.

The isobutyraldehyde conversion rate is 24.6% and the conversion to methacrolein is 12.6%. The methacrolein practical yield is 51% and the productivity amounts to 98 grams of methacrolein per hour per liter of catalyst.

EXAMPLE II

A catalyst is prepared by dissolving 47 grams of silver nitrate in 100 mls. of water, adding 15.8 grams of ammonium carbonate monohydrate to the solution to form a silver carbonate precipitate. The precipitate is dissolved in aqueous ammonia and the solution is diluted to 1 liter with water. To this solution there is dispersed 170 grams of a commercial silica, sold under the trade name Aerosil, having a specific area of 380 sq. meters per gram. The resulting homogeneous paste is dried at 100°–110° for 24 hours and the resulting cake is ground and sifted to obtain grains having diameters in the range of 3-4 mm. which are then calcined at 500°C. for 1 hour.

In this example, the reaction tube comprises a tube of stainless molybdenum steel having an internal diameter of 25 mm, which is surrounded by a heating bath comprising equal weights of molten lead and tin which may be heated electrically. The reaction tube is vertically disposed and is provided with a stainless steel wire gauze at its base to support the catalyst contained in the tube. The condensation system as disclosed in EXAMPLE I likewise is used for treating the reactor effluent in this example.

200 mls. of the catalyst prepared above are placed in the reaction tube, which is then fed with 152 grams per hour of isobutyraldehyde, 50 liters per hour of air and 50 liters per hour of nitrogen. The reaction temperature is maintained at 225° by the molten metal bath. Analysis of the products from the reactor as determined by gas chromatography revealed the following composition:

| | | |
|---|---|---|
| Isobutyraldehyde | 136 | g |
| Methacrolein | 8.5 | g |
| Diacetyl | 1.1 | g |
| Isopropanol | 0.57 | g |
| Acetone | 0.8 | g |
| Acids (calculated as isobutyric acid) | 3 | g |

The isobutyraldehyde unaccounted for in this example was converted into carbon monoxide and carbon dioxide which can be vented from the system.

The isobutyraldehyde conversion rate is 11.8% and its conversion to methacrolein is 6.4%. The methacrolein practical yield is 54.7% and the productivity amounts to 42.5 grams of methacrolein per hour per liter of catalyst.

EXAMPLE III

In this example, the process is carried out in the apparatus used in Example I which is provided with 200 mls. of the catalyst prepared in Example II.

The reaction tube is continuously fed with 145 grams per hour of isobutyraldehyde, 100 liter per hour of air and 50 liters per hour of nitrogen, while the catalytic zone is maintained at a temperature of 240°C. The composition of the reactor effluent is as follows:

| | | |
|---|---|---|
| Isobutyraldehyde | 111 | g |
| Methacrolein | 10 | g |
| Diacetyl | 0.75 | g |
| Isopropanol | 0.3 | g |
| Acetone | 1.3 | g |
| Acids (calculated as isobutyric acid) | 5.5 | g |

The remainder of the isobutyraldehyde conversion products is a mixture of carbon monoxide and carbon dioxide.

In this example, the isobutyraldehyde conversion rate is 23.5%, its conversion to methacrolein is 7% and the practical yield of methacrolein is 30%. The productivity of the catalyst amounts to 50 grams of methacrolein per hour per liter of catalyst.

EXAMPLE IV

A catalyst is prepared by dissolving 47 grams of silver nitrate in one liter of water and adding to the solution 170 grams of the silica utilized in Example II. The resulting homogeneous paste is further refined in the same manner as shown in Example II to form grains in the catalyst having diameters within the range of 3-4 mms.

The reaction furnace of Example II is provided with 300 mls. of catalyst and is continuously fed with 126 grams per hour of isobutyraldehyde, 80 liters per hour of air and 80 liters per hour of nitrogen, while the metallic bath surrounding the reaction zone is maintained at 225°C.

The reactor effluent has the following composition:

| | | |
|---|---|---|
| Isobutyraldehyde | 94.7 | g |
| Methacrolein | 11.4 | g |
| Diacetyl | 1.75 | g |
| Isopropanol | traces | |
| Acetone | 0.6 | g |
| Acids (calculated as isobutyric acid) | 4.2 | g |

The isobutyraldehyde conversion rate is 25%, its conversion to methacrolein is 9.3% and the methacrolein practical yield is 37.5%. The catalyst productivity is 38 grams of methacrolein per hour per liter of catalyst.

It will be apparent from the foregoing that the present invention provides a method for producing methacrolein by oxidative dehydrogenation of isobutyraldehyde which minimizes the formation of undesirable side products formed through oxidation of the isobutyraldehyde feed. Thus the present invention provides a method by which methacrolein can be produced which is both inexpensive and efficient.

It will be understood that various changes can be made in formulation, apparatus, and procedure without departing from the scope of the invention, especially as defined in the following claims.

We claim:

1. A process for producing methacrolein comprising the step of reacting isobutyraldehyde with an oxygen-containing gas selected from the group consisting of air and air or oxygen diluted with an inert gas in the presence of a silver catalyst deposited on a silica carrier at a temperature within the range of 150°–300°C and separating the methacrolein produced.

2. A process as defined in claim 1 wherein the temperature is between 170° and 250°C.

3. A process as defined in claim 1 wherein said oxygen-containing gas is air.

4. A process as defined in claim 1 wherein said oxygen-containing gas contains 5–20% oxygen by volume.

5. A process as defined in claim 1 wherein the molar ratio of oxygen in said oxygen-containing gas to isobutyraldehyde is within the range of 0.1–1 to 1–1.

6. A process as defined in claim 1 wherein the contact time is from 2 to 5 seconds.

7. A process as defined in claim 1 wherein the reaction is carried out at a pressure at least equal to atmospheric pressure.

8. A process as defined in claim 1 wherein the reaction is carried out at a pressure within the range of 1-5 kg/cm² gauge.

9. A process as defined in claim 1 wherein the silver catalyst is in the form of silver oxide.

10. A process as claimed in claim 1 wherein said oxygen-containing gas is air diluted with an inert gas.

11. A process as defined in claim 10 wherein said inert gas is selected from the group consisting of nitrogen and carbon dioxide.

12. A process as defined in claim 1 wherein said carrier is silica.

13. A process as defined in claim 12 wherein said silica carrier has a surface area less than 1,000 square meters per gram prior to impregnation.

14. The process as defined in claim 12 wherein said catalyst is prepared by impregnating substantially pure silica grains with a silver salt.

15. A process as defined in claim 12 wherein said catalyst is prepared by co-precipitating a silver salt and a silica gel, and pelletizing the co-precipitate.

16. A process as defined in claim 12 wherein said catalyst is prepared by impregnating a cake of silica with a silver salt, and converting the impregnated cake to catalyst grains.

* * * * *